US008827046B2

(12) United States Patent
Cahill

(10) Patent No.: US 8,827,046 B2
(45) Date of Patent: Sep. 9, 2014

(54) BRAKE WEAR MEASUREMENT SYSTEM

(75) Inventor: Eric Daniel Cahill, Troy, OH (US)

(73) Assignee: Goodrich Corporation, Charlotte, NC (US)

( * ) Notice: Subject to any disclaimer, the term of this patent is extended or adjusted under 35 U.S.C. 154(b) by 1312 days.

(21) Appl. No.: 12/372,069

(22) Filed: Feb. 17, 2009

(65) Prior Publication Data
US 2009/0205910 A1 Aug. 20, 2009

Related U.S. Application Data

(60) Provisional application No. 61/028,539, filed on Feb. 14, 2008, provisional application No. 61/028,552, filed on Feb. 14, 2008.

(51) Int. Cl.
F16D 66/02 (2006.01)
(52) U.S. Cl.
CPC .................................. F16D 66/026 (2013.01)
USPC ..................................... 188/1.11 L; 188/71.5
(58) Field of Classification Search
USPC ............... 188/1.11 L, 1.11 B, 71.5, 72.1, 162
See application file for complete search history.

(56) References Cited

U.S. PATENT DOCUMENTS

| | | | |
|---|---|---|---|
| 3,018,852 A | | 1/1962 | Stanton |
| 5,226,509 A | | 7/1993 | Smith |
| 5,310,023 A | | 5/1994 | Martinez |
| 5,848,673 A | | 12/1998 | Strauss et al. |
| 7,108,107 B2 | | 9/2006 | Ralea et al. |
| 7,234,785 B1 * | | 6/2007 | McCann et al. ................ 303/89 |
| 2007/0125607 A1 | | 6/2007 | Ralea et al. |
| 2009/0102463 A1 * | | 4/2009 | May .......................... 324/207.16 |
| 2010/0207618 A1 * | | 8/2010 | Erickson et al. .............. 324/228 |
| 2010/0286881 A1 * | | 11/2010 | Cahill ............................. 701/70 |

FOREIGN PATENT DOCUMENTS

| | | |
|---|---|---|
| EP | 0566006 | 10/1993 |
| EP | 0789156 | 8/1997 |
| EP | 1914135 | 4/2008 |
| EP | 1978273 | 10/2008 |
| GB | 2310015 | 8/1997 |
| JP | 11173352 | 6/1999 |

OTHER PUBLICATIONS

FR; Preliminary Search Report dated Sep. 2, 2011 in Application No. 0959348.
Patent Act 1977: Search Report under Section 17(5), dated Mar. 1, 2010.
GB; Examination Report dated Aug. 1, 2011 in Application No. GB0902431.6.
Patents Act 1977: Further Search Report under Section 17.
Office Action Restriction dated Aug. 6, 2012 in U.S. Appl. No. 12/388,374.
Office Action dated Dec. 12, 2012 in U.S. Appl. No. 12/388,374.

* cited by examiner

Primary Examiner — Pamela Rodriguez
(74) Attorney, Agent, or Firm — Snell & Wilmer L.L.P.

(57) ABSTRACT

A brake measurement system that utilize angular and/or linear displacement sensors to measure movement of a member operatively coupled to a movable member of a brake, wherein displacement of the movable member of the brake is indicative of brake wear. The system can include a twisted spline member operatively coupled to a moveable member of a brake assembly, and an angular displacement sensor operatively coupled to the twisted spline member. Movement of the moveable member is converted by the twisted spline member into an angular displacement sensed by the angular displacement sensor.

8 Claims, 8 Drawing Sheets

BRAKE WEAR MEASUREMENT SYSTEM

RELATED APPLICATIONS

This application claims the benefit of U.S. Provisional Application Nos. 61/028,539 filed on Feb. 14, 2008, and 61/028,552 filed on Feb. 14, 2008, both of which are hereby incorporated by reference herein.

FIELD OF THE INVENTION

The invention herein described relates generally to brake control systems, more particularly to electronic braking systems, and still more particularly to aircraft braking systems.

BACKGROUND

Present day aircraft brake systems have employed wear pin indicators to measure overall wear of the brake disk stack. As the brake disks wear, the collective axial thickness thereof will decrease. Brake wear is indicated by the length of the pin relative to a reference plate. In a typical arrangement the length of the pin decreases as the brake wears. Such arrangement requires a visual inspection of the pin to determine wear and is inherently imprecise.

U.S. Pat. No. 7,108,107 to Ralea provides a system for electrically measuring brake wear in a brake actuator assembly. The system includes an electric transducer which detects a change in the thickness of the brake stack in order to provide an indication of brake wear. While this system provides good results and is suitable for many applications, there remains a strong desire to continue to improve such type of system.

SUMMARY OF THE INVENTION

Accordingly, the present invention sets forth several brake measurement systems that utilize angular and/or linear displacement sensors to measure movement of a member operatively coupled to a movable member of a brake, wherein displacement of the movable member of the brake is indicative of brake wear.

According to an aspect of the invention, a brake measurement system comprises a linkage assembly operatively coupled to a moveable member of a brake assembly, and an angular displacement sensor operatively coupled to the linkage assembly. Movement of the moveable member is converted by the linkage assembly into an angular displacement sensed by the angular displacement sensor. In one embodiment, a twisted spline member is operatively coupled to the moveable member of the brake assembly and the angular displacement sensor. Movement of the movable member is converted by the twisted spline member into an angular displacement sensed by the angular displacement sensor. The twisted spline member can be a drill bit and the system can measure brake wear. The moveable member can be a brake pressure plate or an actuator head which engages a brake pressure plate. In another embodiment, the linkage assembly can include a rack having gear teeth for engaging a pinion gear associated with the angular displacement sensor.

In accordance with another aspect, a brake measurement system comprises a linkage assembly operatively coupled to a moveable member of a brake assembly, and a linear displacement sensor operatively coupled to the linkage assembly. Movement of the moveable member is converted by the linkage assembly into a reduced linear displacement sensed by the linear displacement sensor, whereby the movement of the moveable member is greater that the sensed displacement.

The system can utilize a variety of linkage assemblies. For example, the linkage assembly can include a cable operatively coupled to both the movable member and the linear displacement sensor, and at least one pulley around which the cable travels, the pulley reducing the displacement of the linear displacement sensor relative to the displacement of the movable member. As another example, the linkage assembly can include a slot hinge operatively coupled to both the linear displacement sensor and the movable member.

In one embodiment, the linkage assembly includes a wear pin that moves with the movable member, the wear pin having at a distal end thereof an angled surface for engaging the linear displacement sensor. A plunger of the linear displacement sensor is biased against the angled surface such that movement of the pin results in a linear displacement of the plunger as the angled surface moves with respect to the plunger. The linear displacement sensor is mounted perpendicular to a rotational axis of the brake assembly.

The linkage assembly can also include a cable operatively coupled at a first end to the movable member, and a threaded shaft supported for rotation by at least one nut and operatively coupled to the linear displacement sensor, wherein the cable is wrapped around the rotatable shaft such that movement of the moveable member results in rotation of the rotatable shaft, and wherein rotation of the shaft produces a linear movement of the shaft that is sensed by the sensor.

In accordance with another aspect, a brake measurement system comprises a linkage assembly operatively coupled to a moveable member of a brake assembly, and a linear displacement sensor operatively coupled to the linkage assembly. Movement of the moveable member is converted by the linkage assembly into a linear displacement sensed by the linear displacement sensor. The linkage assembly includes a first piston/cylinder, the piston of the first piston/cylinder arrangement adapted for movement in response to movement of the moveable member. A second piston/cylinder arrangement is fluidly connected to the first piston/cylinder arrangement such that movement of the respective pistons of each piston/cylinder arrangement is linked, with the piston of the second piston/cylinder operatively coupled to the linear displacement actuator. Movement of the moveable member is transmitted to the linear displacement sensor via the first and second piston/cylinder arrangements. A bore of the first piston/cylinder arrangement can be less than a bore of the second piston/cylinder arrangement such that a given linear displacement of the piston of the first piston/cylinder arrangement results in a smaller linear displacement of the piston of the second piston/cylinder arrangement. The linear displacement sensor can be oriented at any direction relative to a rotational axis of the brake, for example, and can also be located in virtually any desired location.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION

The present invention will now be described with reference to the drawings, wherein like reference labels are used to refer to like elements throughout.

The present invention relates to a brake wear measurement system incorporating an electrical wear sensor. Since a primary use of the brake wear measurement system is in conjunction with aircraft brakes, a feature of the present invention is the ability to tolerate the extremely harsh wheel and brake environment of an aircraft. In particular, non-axial vibration levels are often very high in aircraft brake systems. The brake wear measurement systems of the present invention are very robust to sustain such vibration levels as well as to operate in the harsh environment.

Figure 1:
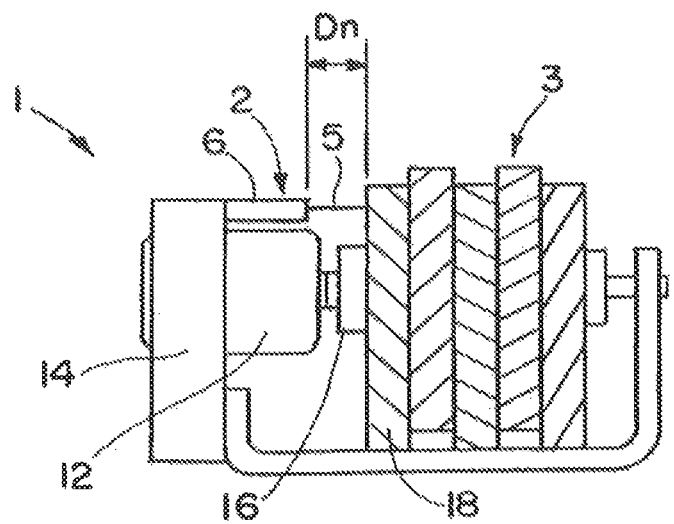
FIG. 1 is a schematic diagram of a brake actuator assembly with a brake wear measurement system in accordance, with the invention in relation, to a new brake disk stack.
Figure 2:
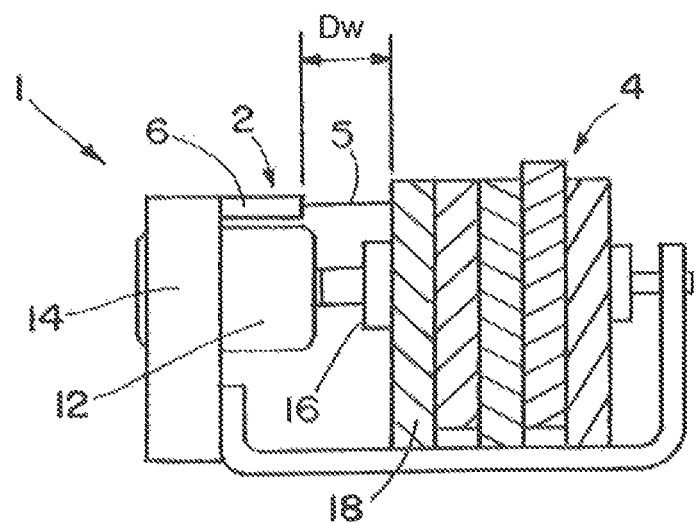
FIG. 2 is a schematic diagram of a brake actuator assembly with a brake wear measurement system in accordance with the invention in relation to a worn brake disk stack.

With reference to FIGS. 1 and 2, a brake actuator assembly 1 including an exemplary brake wear measurement system 2 in accordance with the invention is illustrated in relation to a new brake disk stack 3 (FIG. 1) and a worn brake disk stack 4 (FIG. 2). As will be described in more detail below, the brake wear measurement system 2 utilizes a brake wear pin or other linkage assembly, generally indicated by reference numeral 5, in combination with a sensor 6, to sense brake wear. More particularly, brake wear is determined by measuring the displacement D between a reference point, for example a housing of a piston actuator 12 mounted to support 14, and a brake pressure plate 18. As will be appreciated, in FIG. 1 the distance $D_n$ of a new brake stack 3 is shorter than the distance $D_w$ of a worn brake stack 4. As will be appreciated, the displacement D is proportional to an amount of brake wear.

To measure the displacement D, the linkage assembly 5 is attached to the pressure plate 18 and/or the piston 12 and operatively coupled with the sensor 6. In one embodiment, the linkage assembly 5 is a wear pin having a geometry such that as the wear pin moves linearly with the pressure plate 18, the wear pin can cause a rotation that can be sensed by an angular displacement sensor. The output of the sensor 6 is directly proportional to the absolute linear displacement of the brake pressure plate 18. Depending on the embodiment, the sensor 6 can be a linear or angular displacement sensor, for example.

Figure 3:
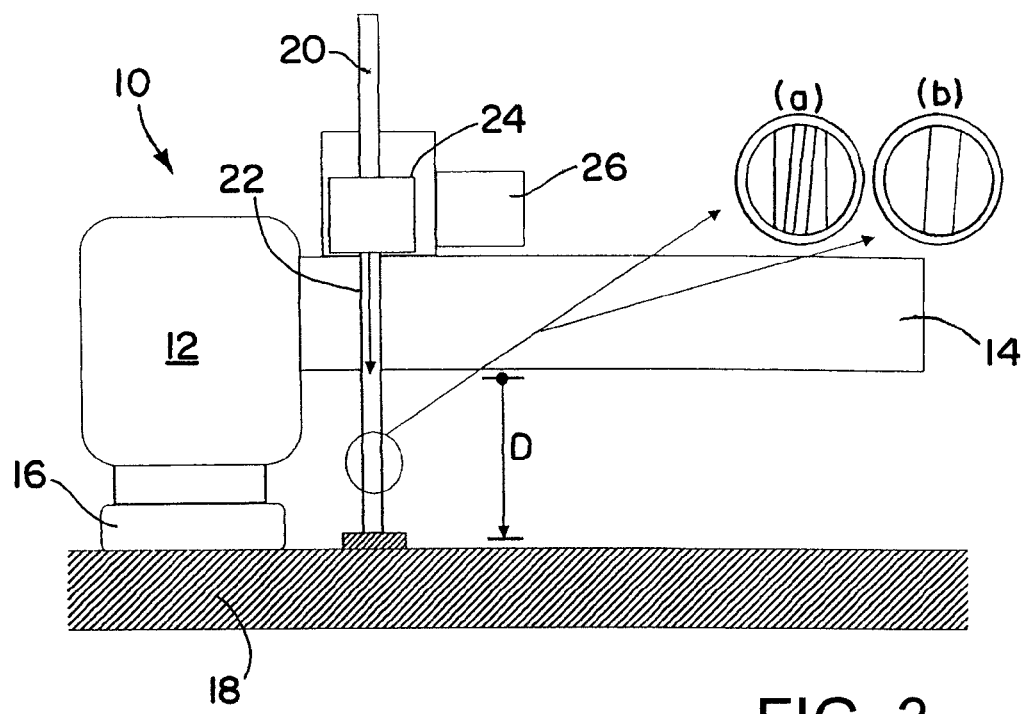
FIG. 3 is a schematic diagram of an exemplary brake wear measurement system in accordance with the invention.

Referring to FIG. 3, a first embodiment of the present invention is represented schematically as a brake wear measurement system 10. As is conventional, the brake itself includes a piston 12 or other type actuator supported within the brake assembly by a support 14. The head 16 of the piston 12 or other type actuator applies pressure to the pressure plate 18 in order to exert a controllable braking force on the brake stack (not shown). As is conventional, as the brake stack wears the stack will become thinner and the distance D between the pressure plate 18 and the piston 12 housing/support 14 will increase. In some applications, the brake stack may wear (e.g., become thinner) by up to 2 inches or more.

The brake wear measurement system 10 includes a brake wear pin 20 which is attached at one end to the pressure plate 18 as shown in FIG. 3. The brake wear pin 20 extends perpendicularly away from the pressure plate 18 and through a through hole 22 in the support 14. The through hole 22 is sized such that the wear pin 20 may freely move linearly though the through hole 22. The brake wear measurement system 10 further includes an angular displacement sensor 24. The angular displacement sensor 24 is aligned axially with the through hole 22 such that the wear pin 20 passes through a rotor assembly of the angular displacement sensor 24.

In a different embodiment, the angular displacement sensor 24 may be secured to the piston housing 12/support 14 via a bracket or the like so as to extend away from the piston housing 12/support 14 in a plane parallel to the pressure plate 18. In this manner, there is no need for the through hole 22.

In accordance with the exemplary embodiment of FIG. 3, the brake wear pin 20 has a twisted spline geometry at least in a region which passes through the sensor 24 (see insets (a) and (b) in FIG. 3). The sensor 24 is configured to include one or more engagement members in the rotor assembly that engage and/or follow a surface or surfaces of the wear pin 20 as the wear pin 20 passes linearly therethough. As the brake stack wears, the wear pin 20 moves in the linear direction (e.g., in the downward direction in FIG. 3) with the pressure plate 18. The twisted spline geometry of the wear pin 20 converts the linear displacement of the wear pin 20 into an angular displacement of the angular displacement sensor 24. In this manner, the output of the angular displacement sensor 24 is directly proportional to the absolute linear displacement of the wear pin 20, and thus that of the brake pressure plate 18. The linear displacement of the brake pressure plate 18 in turn represents the amount of brake wear, as will be appreciated.

The output of the angular displacement sensor 24 is an electrical signal that is provided via a connector 26 to a remaining portion of the overall brake system (not shown). The output of the angular displacement sensor 24 represents the brake wear and may be utilized by the system to provide an indication as to when the brake stack needs to be replaced, etc.

Exemplary angular displacement sensors 24 suitable for use in accordance with the invention are commercially available from Moog Components Group are marketed as "low cost brushless pancake resolvers". Other types of known angular displacement sensors 24 may also be used without departing from the scope of the invention. For example, the angular displacement sensor 24 may be some other resolver for sensing angular displacement, a rotary variable differential transformer (RVDT), a potentiometer, etc.

It will be appreciated that the wear pin 20 as described above could instead be attached to the piston head 16 and thus provide an indication of the position of the piston head 16 and/or brake position using the techniques described in the aforementioned U.S. Pat. No. 7,108,107 to Ralea, which is hereby incorporated herein by reference in its entirety.

The geometry of the wear pin 20 is that of a twisted spline as discussed above. A low cost embodiment of such a spline may be, for example, simply a twisted flat piece of metal.

Figure 4:
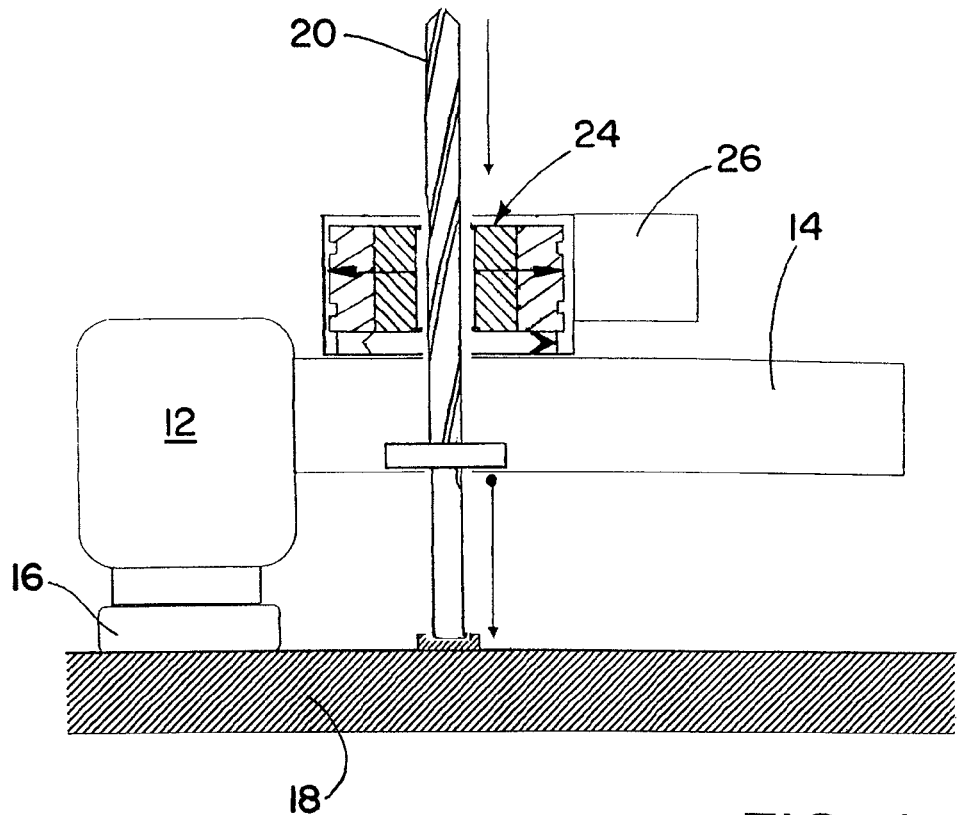
FIG. 4 is a schematic diagram of another exemplary brake wear measurement system in accordance with the invention.

Alternatively, another relatively low cost embodiment may use a drill bit as the twisted spline 20 as represented in FIG. 4. For example, tooling balls may be incorporated within the rotor of the angular displacement sensor 24. The tooling balls may follow the grooves of the drill bit 20 such that linear movement of the drill bit is converted to angular displacement of the sensor 24 just as in the embodiment of FIG. 3.

Figure 5:
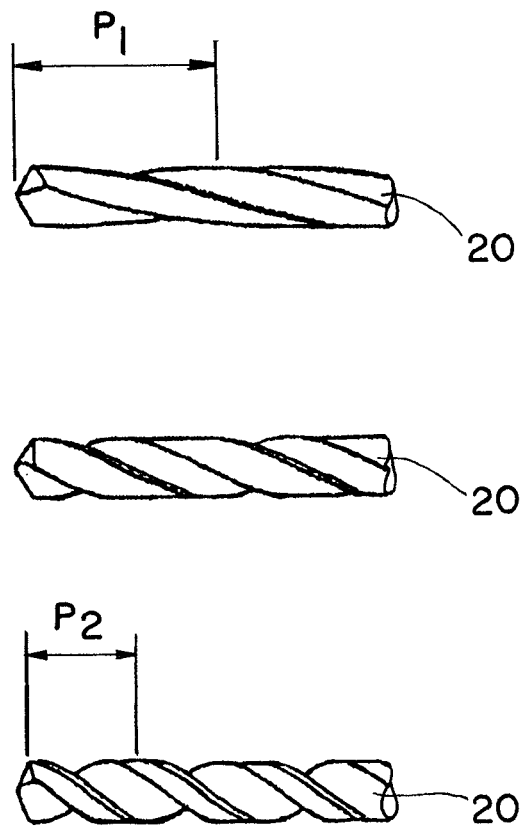
FIG. 5 is schematic diagram of exemplary wear pins in accordance with the invention.
Figure 6:
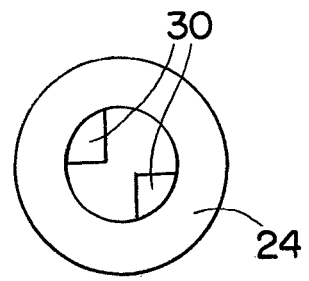
FIG. 6 is a schematic diagram of an angular displacement sensor for use in accordance with the exemplary embodiments of the present invention.

FIG. 5 illustrates an exemplary pitch of the twisted spline that 20 may be used to determine the ratio of linear movement of the spline 20 to angular movement of the sensor 24 as will be appreciated. For example, a larger pitch would result in less angular displacement for a given linear displacement (e.g. slower), while a smaller pitch would result in a greater angular displacement for the same linear displacement (e.g. quick). FIG. 6 illustrates how the sensor 24 includes one or more surfaces (e.g., 30) that engage the surface or surfaces (e.g., grooves) of the twisted spline 20.

Turning now to FIGS. 7-15, and initially to FIG. 6, several alternative brake wear measurement system designs are shown and will be described. The systems are similar in that they all employ at least one linear or angular displacement sensor to measure brake wear by detecting movement of various linkages, cables, etc. in contact with the a movable part of the brake (e.g., pressure plate).

Figure 7:
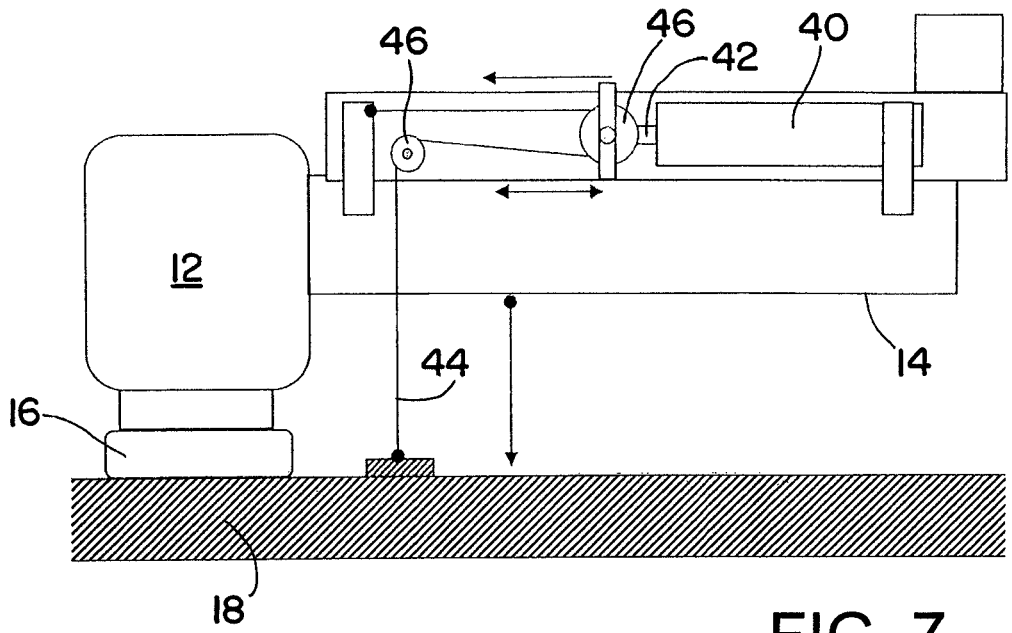
FIG. 7 is a schematic diagram of another exemplary brake wear measurement system in accordance with the invention.

In FIG. 7, a linear displacement sensor 40 having a movable plunger 42 is mounted on support 14 and a cable 44, wire or the like is operatively coupled to both the pressure plate 18 and the support 14. The cable 44 is coupled to the linear displacement sensor plunger 42 via pulleys 46 such that movement of the pressure plate 18 produces an extension of the linear displacement plunger 42.

By turning the sensor 40 90° (e.g., a longitudinal axis of the linear displacement sensor extends generally perpendicular to a rotational axis of the brake disk stack), several advantages are achieved including: 1) there is more space to mount the sensor 40, 2) the effects of vibration are decreased as compared to having the sensor 40 cantilevered from the piston housing 12, 3) the cable 44 lessens the vibration to the sensor's target (isolations) and the sensor 40 as a whole, and 4) allows the displacement to be cut in half (more loops in the cable 44 can cut the displacement down even further, if desired), allowing a similar reduction in size and/or weight of the sensor 40.

As an alternative, a flexible shaft could be used in instead of the cable 44 and pulleys 46, but the stroke would of course be doubled as compared to the illustrated embodiment. Of course, it is also possible to have single cable and to place multiple pulleys into the sensor's body to thereby cut displacement even more. As will be appreciated, lowering the displacement to ¼ or more (i.e., reducing the displacement by a factor of 4) greatly reduces the size and/or weight of the design.

Figure 8:
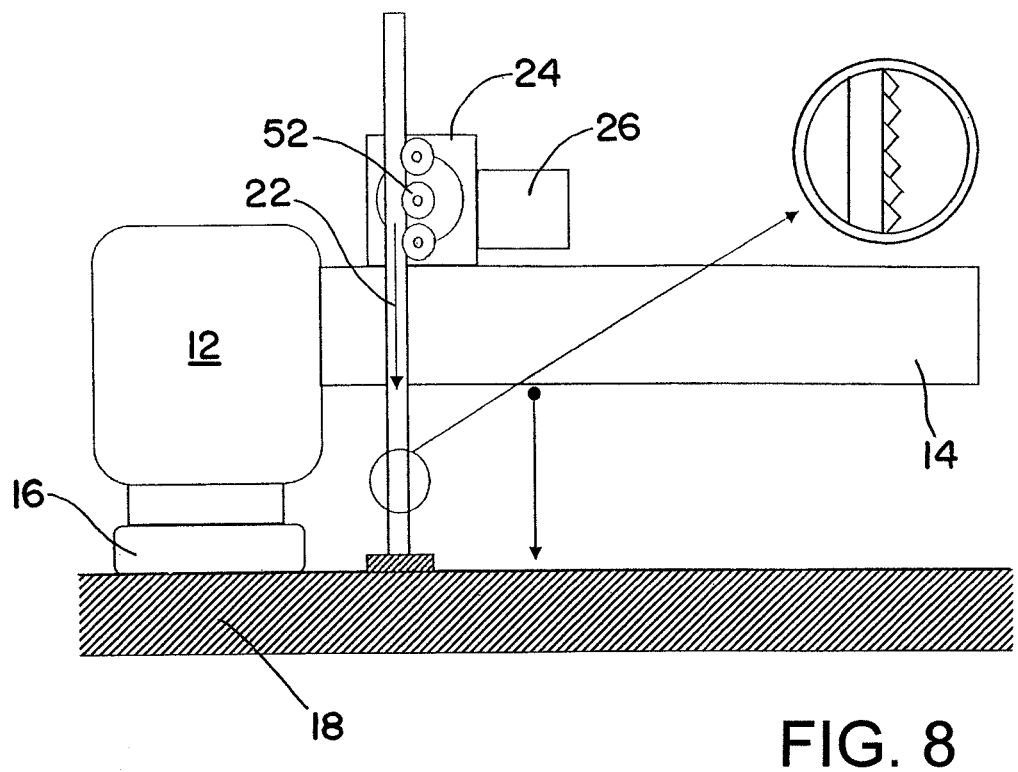
FIG. 8 is a schematic diagram of yet another exemplary brake wear measurement system in accordance with the invention.

In FIG. 8, a rack and pinion is employed to rotate rotary sensor 24 monted on support 14. As will be appreciated, instead of a twisted spline as shown in FIGS. 1-4, the wear pin 20 is now in the form of a rack having gear teeth as shown for engaging a pinion gear 52 associated with sensor 24. Linear movement of the rack results in rotation of the pinion gear 52, and ultimately rotation of the angular displacement sensor 24.

Figure 9:
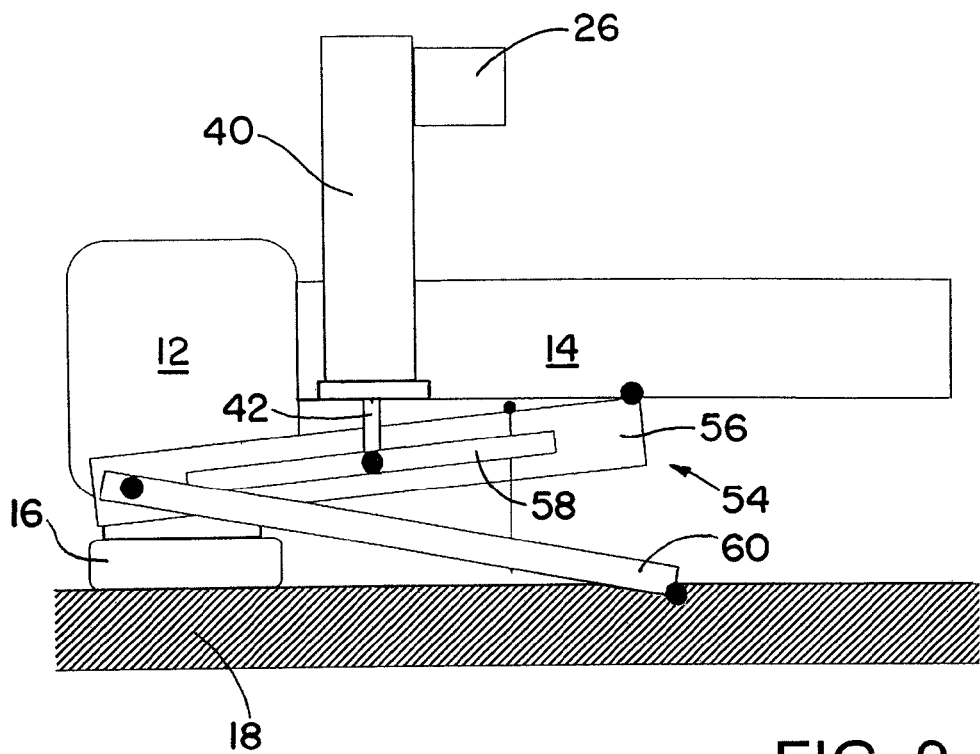
FIG. 9 is a schematic diagram of still another exemplary brake wear measurement system in accordance with the invention.

Turning to FIG. 9, yet another brake wear measurement system is illustrated. In this embodiment, a slot hinge 54 is employed to link the pressure plate 18 to the plunger 42 of the linear displacement sensor 40. The slot hinge 54 has an upper arm 56 hingedly secured to the support 14 and the piston housing 12. An end of the plunger 42 of the linear displacement sensor 40 is hingedly secured for sliding movement to the upper arm 56 in a slot 58 therein. A lower arm 60 of the slot hinge 54 is secured to the pressure plate 18 and the upper arm 56 and the piston housing 12. The slot 58 in the upper arm 56 permits sliding movement between the upper arm 56 and the plunger 42 during movement of the pressure plate 18. This arrangement effectively reduces the movement of the pressure plate 18 that is transferred to the plunger 42 for sensing by the sensor 40.

Figure 10:
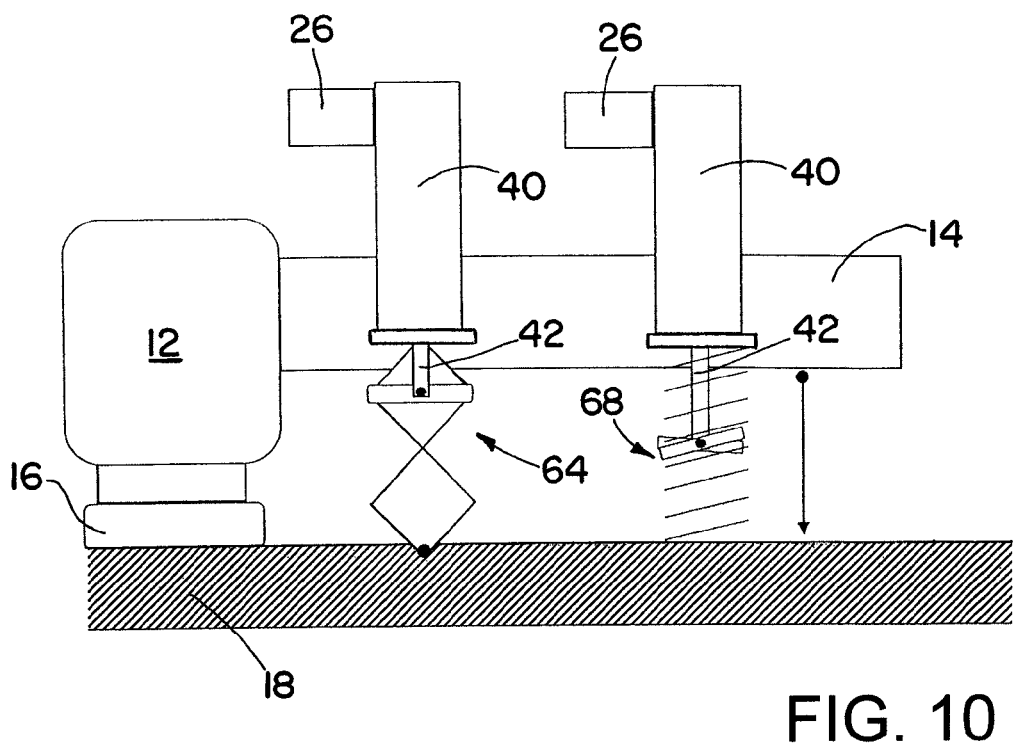
FIG. 10 is a schematic diagram of another exemplary brake wear measurement system in accordance with the invention.

In FIG. 10, two alternative designs are illustrated, with one design implementing an accordion assembly 64 and the other design implementing a coil spring element 68. The accordion assembly 64 is operatively coupled to both the pressure plate 18 and a fixed portion of the linear displacement sensor 40. The plunger 42 is connected to the accordion assembly 64 at a midpoint thereof. The accordion assembly 64 reduces the relative displacement of the linear displacement sensor 40 by about ⅓ for a given wear displacement. Other accordion assembly designs can reduce the relative displacement more or less as desired. By reducing the stroke of the sensor 40, for example to a ±10 mm (±0.4") stroke, sensor issues relating to "exposure" and vibration can be reduced.

In the embodiment implementing the coil spring element 68, the coil spring element 68 is operatively coupled to both the pressure plate 18 and a fixed portion of the linear displacement sensor 40. The plunger 42 of the linear sensor 40 is connected to the spring 68 at a midpoint thereof. As will be appreciated, movement of the pressure plate 18 results in the spring stretching. Since the plunger 42 is connected at a midpoint of the spring 68 and the spring stretches roughly an equal amount above and below the point of connection of the plunger 42, the movement of the pressure plate 18 that is transferred to the plunger is approximately reduced.

Figure 11:
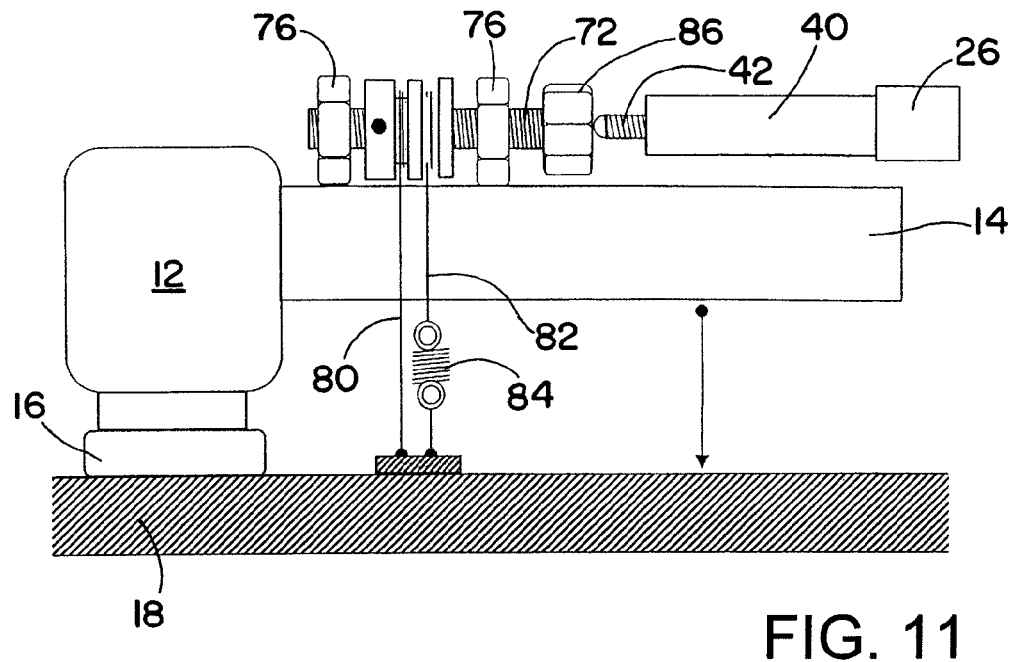
FIG. 11 is a schematic diagram of still yet another exemplary brake wear measurement system in accordance with the invention.

In FIG. 11, a linear displacement sensor 40 is mounted horizontally to the support 14 along with a threaded bolt 72 that is supported for rotation, and threadedly engaged with, two nuts 76 fixed to the support 14. A first cable 80 is wrapped around the bolt 72 and secured at its distal end to the pressure plate 18 such that movement of the pressure plate 18 results in rotation of the bolt 72. A second cable 82 can be wrapped around the bolt in an opposite direction to that of the first cable and secured at its distal end to the pressure plate 18. A spring 84 can provide tension on the second cable 82 so as to take up any slack in the cable and allows for rewinding of cable 80 when the brake stack is replaced, for example.

As the brake wears the pressure plate 18 moves pulling on the cable 80. The cable causes the bolt 72 to rotate thereby longitudinally displacing a head 86 of the bolt 72. This displacement of the head 86 is sensed by the linear displacement sensor 40 (LVDT sensor). Since a brake wears in one direction, a mechanical "diode" like adjuster assembly (e.g., a ratchet) could also be used. This would allow the cable to spool out, but not back in. In such an assembly, the sensor cable would generally need to be "reset" when the brake is refurbished.

Figure 12:
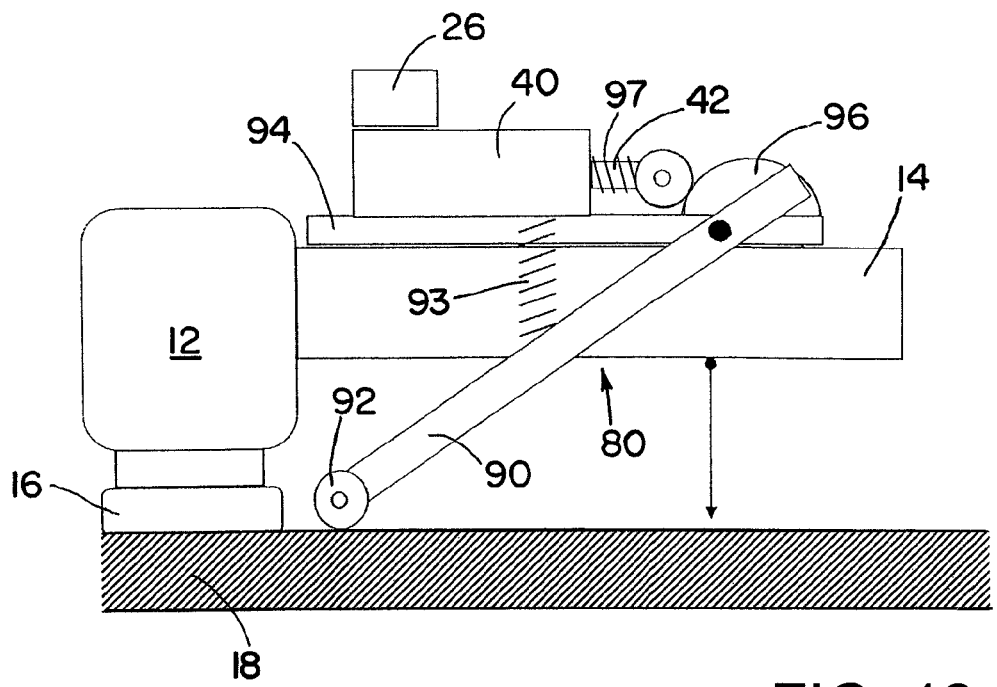
FIG. 12 is a schematic diagram of another exemplary brake wear measurement system in accordance with the invention.

Turning to FIG. 12, a rod and cam assembly 80 is illustrated for actuating the linear displacement sensor 40 in response to movement of the pressure plate 18. The assembly 80 includes a rod 90 having at a first end a roller 92 in contact with the pressure plate 18, and secured for pivoting movement to a support rod 94 mounted to support 14. A spring 93 biases the rod 90 against the pressure plate 18. A cam 96 is mounted to rod 90 for rotation in response to movement of the pressure plate 18. The plunger 42 is biased against the cam by a spring 97.

As the pressure plate 18 moves, the rod 90 and cam 96 rotate. A spring 98 maintains the rod 90 in contact with the pressure plate 18. As the cam is rotated, the plunger 42 follows the cam resulting in the plunger 42 being urged outward from the sensor 40. The cam 96 can have a geometry that causes the linear displacement sensor 40 to be displaced in proportion to wear displacement. The benefit of this design is that the cam 96 can be designed to create a displacement of virtually any length in response to a given movement of the pressure plate 18.

Figure 13:
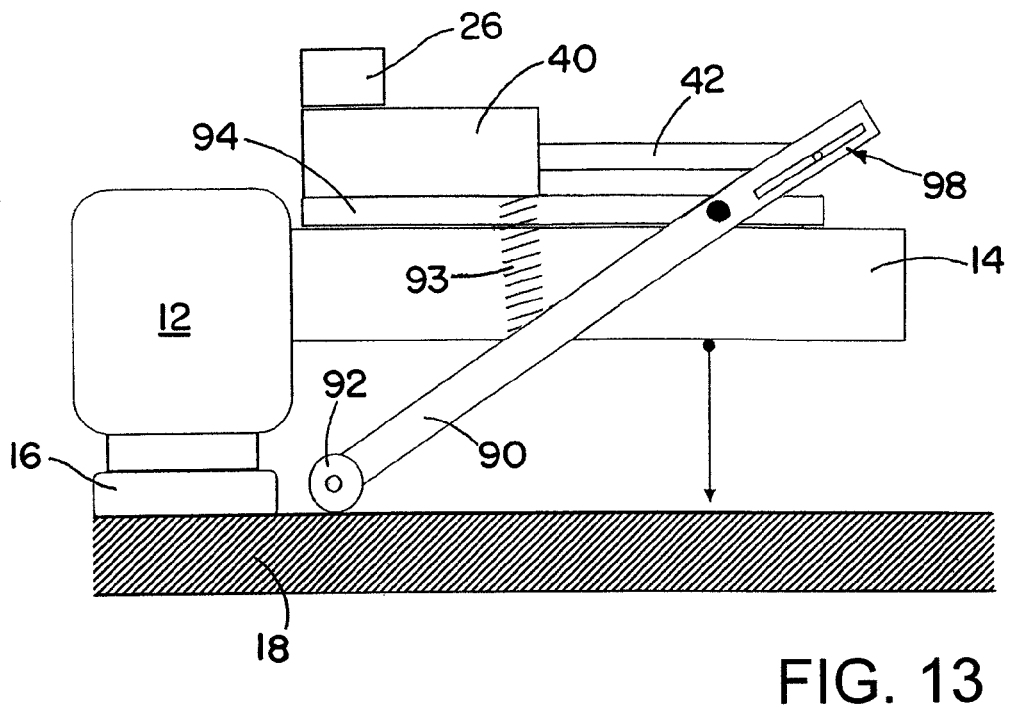
FIG. 13 is a schematic diagram of yet another exemplary brake wear measurement system in accordance with the invention.

In FIG. 13, another linkage assembly is illustrated. The linkage assembly is similar to the linkage assembly of FIG. 12 but does not include a cam. Instead, rod 90 is connected to the plunger 42 of the linear displacement sensor 40 via a slotted connection 98 so that rotation of the rod 90 about its point of connect to support rod 93 in response to movement of the pressure plate 18 results in linear displacement of the linear displacement sensor 40.

Figure 14:
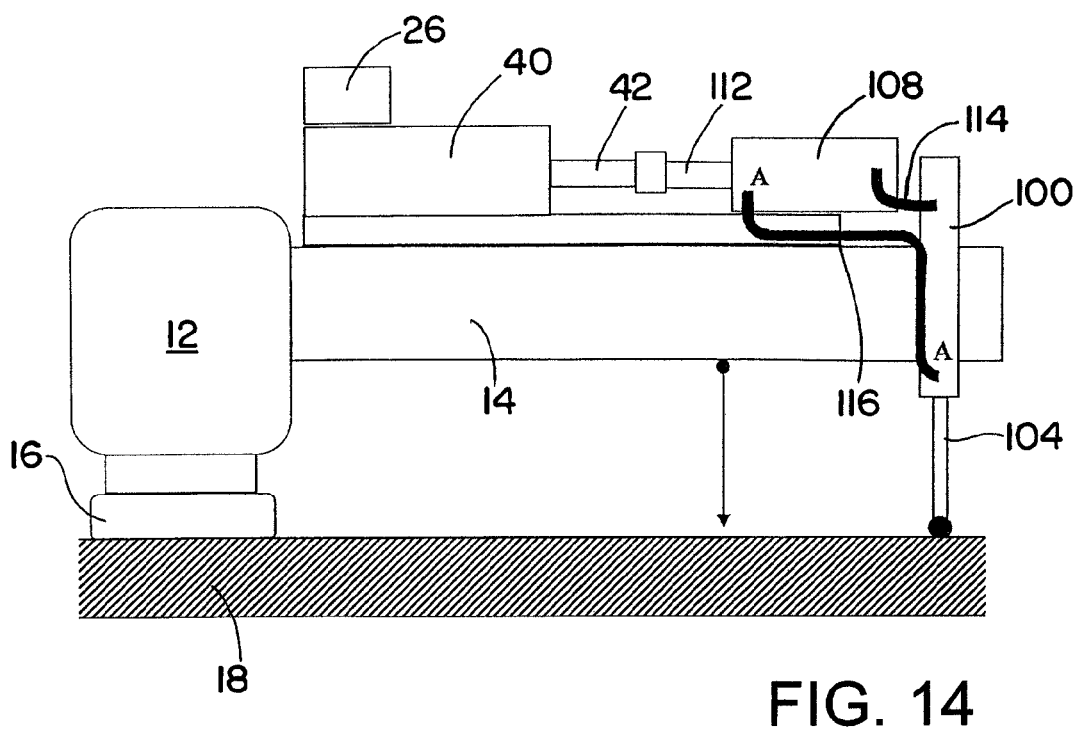
FIG. 14 is a schematic diagram of yet still another exemplary brake wear measurement system in accordance with the invention.

Turning to FIG. 14, a first piston/cylinder arrangement 100 is mounted to support 14. A piston rod 104 extending from the piston/cylinder arrangement 100 is secured to the pressure plate for movement therewith. A second piston/cylinder arrangement 108 is mounted to the support 14 with its piston rod 112 connected to the plunger 42 of the linear displacement sensor 40. Respective fluid inlets and outlets of the first and second piston/cylinder arrangements are fluidly connected together via supply/return lines 114 and 116. Accordingly, movements of the pistons/piston rods of each piston/cylinder assembly are linked.

As the pressure plate 18 moves in response to brake wear, rod 104 of the first piston and cylinder arrangement 100 is pulled downward resulting in movement of the rod 112 of the second piston and cylinder arrangement 108, since the piston/cylinder arrangements are fluidly connected. As will be appreciated, the length and diameters of the two piston/cylinder arrangements allow the stroke to be at very different scales and migrated to any axis. For example, a bore (diameter) of the first piston/cylinder arrangement 100 can be less than a bore of the second piston/cylinder arrangement 108 such that a given linear displacement of the piston of the first piston/cylinder arrangement 100 results in a smaller linear displacement of the piston of the second piston/cylinder arrangement 108. The design can generally be assembled from off-the-shelf components and is inherently protected from the environment. As will be appreciated, the cylinder ports labled "A" can take air in and out directly to the atmosphere, if so desired. The piston/cylinder arrangements can be pneumatic or hydraulic, for example.

Figure 15:
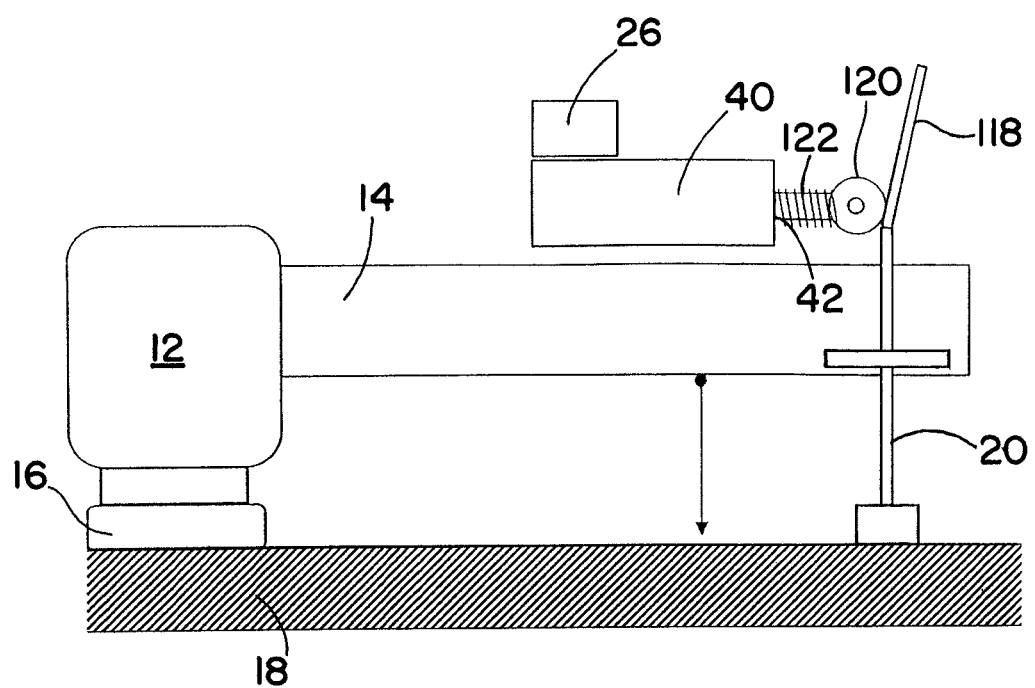
FIG. 15 is a schematic diagram of another exemplary brake wear measurement system in accordance with the invention.

Turning now to FIG. 15, a wear pin 20 is illustrated in contact with pressure plate 18. An upper portion 118 of the wear pin 20 is bent at an angle thereby forming an angled surface against which a roller 120 attached to an end of the plunger 42 of the linear displacement sensor 40 is positioned. A spring 122 biases roller 120 against the angled upper portion 118 of the rod 20.

As the pressure plate 18 moves the wear pin 20 moves as does the target (e.g., the angled upper portion 118 of the rod 20) for the linear displacement sensor 40. Since the spring 122 biases the roller 120 against the angled surface, the plunger 42 generally extends as the wear pin 20 drops. As will be appreciated, the geometry of the target, for example the degree to which the upper portion 118 is angled, allows the stroke of the sensor 40 to be scaled down considerably, if desired.

Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims.

What is claimed is:

1. A brake wear measurement system, comprising:
a linkage assembly operatively coupled to a translationally moveable member of a brake assembly; and
an angular displacement sensor operatively coupled to the linkage assembly,
wherein movement of the translationally moveable member is converted into rotational movement by the linkage assembly to create an angular displacement to be sensed by the angular displacement sensor.

2. A brake wear measurement system as set forth in claim 1, wherein the linkage assembly includes a twisted spline member operatively coupled to the translationally moveable member of the brake assembly and the angular displacement sensor, wherein movement of the translationally movable member is converted by the twisted spline member into an angular displacement sensed by the angular displacement sensor.

3. A brake wear measurement system as set forth in claim 2, wherein the twisted spline member is a drill bit.

4. A brake wear measurement system as set forth in claim 1, wherein the system measures brake wear.

5. A brake wear measurement system as set forth in claim 1, wherein the translationally moveable member is a brake pressure plate.

6. A brake wear measurement system as set forth in claim 1, wherein the translationally moveable member is an actuator head which engages a brake pressure plate.

7. A brake wear measurement system as set forth in claim 1, wherein the linkage assembly includes a rack having gear teeth for engaging a pinion gear associated with the angular displacement sensor, wherein linear movement of the rack results in rotation of the pinion gear.

8. A brake actuator assembly including at least one brake actuator and the brake wear measurement system of claim 1.

* * * * *